US009148845B2

(12) United States Patent
Guo et al.

(10) Patent No.: US 9,148,845 B2
(45) Date of Patent: Sep. 29, 2015

(54) METHOD FOR DISCOVERING NEIGHBORING NODES IN WIRELESS NETWORKS

(71) Applicant: Mitsubishi Electric Research Laboratories, Inc., Cambridge, MA (US)

(72) Inventors: Jianlin Guo, Newton, MA (US); Philip Orlik, Cambridge, MA (US); Kieran Parsons, Cambridge, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 93 days.

(21) Appl. No.: 14/033,923

(22) Filed: Sep. 23, 2013

(65) Prior Publication Data

US 2015/0085696 A1    Mar. 26, 2015

(51) Int. Cl.
*H04J 1/16* (2006.01)
*H04W 48/16* (2009.01)

(52) U.S. Cl.
CPC ..................... *H04W 48/16* (2013.01)

(58) Field of Classification Search
CPC ................ H04W 8/005; H04W 8/26
USPC ......................... 370/254, 338, 315
See application file for complete search history.

(56) References Cited

U.S. PATENT DOCUMENTS

| | | | |
|---|---|---|---|
| 8,335,505 B2 | 12/2012 | Han | |
| 2005/0128975 A1* | 6/2005 | Kobayashi et al. | 370/328 |
| 2006/0146742 A1* | 7/2006 | Kawahara et al. | 370/328 |
| 2007/0268919 A1* | 11/2007 | Sarikaya et al. | 370/401 |
| 2009/0052416 A1* | 2/2009 | Kumazawa et al. | 370/338 |
| 2010/0098034 A1* | 4/2010 | Tang et al. | 370/338 |
| 2011/0007669 A1* | 1/2011 | Yoon | 370/255 |
| 2012/0084568 A1 | 4/2012 | Sarikaya | |
| 2012/0188874 A1* | 7/2012 | Kumagai et al. | 370/235 |
| 2013/0091269 A1 | 4/2013 | Zhang | |

* cited by examiner

*Primary Examiner* — Kan Yuen
(74) *Attorney, Agent, or Firm* — Dirk Brinkman; Gene Vinokur

(57) ABSTRACT

A method discovers neighboring nodes in a wireless network of nodes. The nodes include a set of concentrators acting as IPv6 routers and a set of sensor nodes acting as IPv6 hosts. The sensor nodes can also act as relay nodes. In each node, a 64-bit interface ID is configured using a 48-bit MAC address. In each node, a unique IPv6 link-local address is configured using the 64-bit interface ID. In each node, the neighboring nodes are discovered by transmitting unsolicited Neighbor Advertisement (NA) messages. A Router Advertisement (RA) messages is distributed from the concentrators to the sensor nodes meters by using the relay nodes. In each node, a unique IPv6 address is configured and registered at the concentrators by using the relay nodes.

14 Claims, 7 Drawing Sheets

METHOD FOR DISCOVERING NEIGHBORING NODES IN WIRELESS NETWORKS

FIELD OF THE INVENTION

This invention relates generally to discover neighboring nodes in IPv6 networks, and more particularly to multi-hop IPv6 neighboring node discovery in wireless networks such as smart meter and sensor networks, and networks used for industrial automation, building and home automation and environment monitoring.

BACKGROUND OF THE INVENTION

In an IPv6 network of nodes, neighbor discovery (ND) configures IPv6 addresses of the nodes (hosts and routers), discovers other nodes on link, and discovers routers to forward data packets. The conventional IPv6 ND protocol is specified in the IETF (Internet Engineering Task Force) standard RFC 4861, which defines Router Solicitation (RS), Router Advertisement (RA), Neighbor Solicitation (NS), Neighbor Advertisement (NA), and Redirect messages for neighbor discovery purposes. All the standards referenced herein are well known and readily available from a number of sources.

In the conventional IPv6 network, the routers broadcast the RA messages periodically, the hosts receive the RA messages from the routers, configure their IPv6 addresses and select routers for packet forwarding. According to RFC 4861, a host can receive the RA message from at least one router, that is, 1-hop communication between the router and the host. RFC 4861 does not consider sleeping hosts. A sleeping host is a node not actively transmitting. Therefore, RFC 4861 is not suitable for emerging low power and lossy networks (LLNs), where sleeping host must be supported.

To meet requirements of the LLNs, IETF 6LoWPAN (IPv6 over Low-Power Wireless Personal Area Networks) Working Group (WG) has developed a new ND protocol RFC 6775, which optimizes the IPv6 ND protocol RFC 4861 for LLNs. The optimizations include host-initiated interactions to support sleeping hosts, and multi-hop distribution of a prefix by introducing 6LoWPAN Router. Host-initiated interaction removes the need for periodic or unsolicited RA message from the routers to the hosts. 6LoWPAN routers can transmit and receive the RA and RS messages and forward and route IPv6 packets, and are present only in the route-over a topology, where routing decisions take place at the network layer and hosts are connected to the 6LoWPAN border router through the use of intermediate network layer (IP layer) routing.

A route-over topology typically includes a 6LoWPAN border router, a set of 6LoWPAN routers, and hosts. Hosts are typically multiple hops away from a 6LoWPAN border router. The 6LoWPAN routers do not configure the IPv6 prefix, which is configured at 6LoWPAN border router. Hosts in the 6LoWPAN network receive the RA message from the 6LoWPAN router in a multi-hop manner or directly from the 6LoWPAN border router. In other words, communication between the host and the router is also 1-hop.

Security has been added to IPv6 neighbor discovery. U.S. Patent Publication 20120084568 describes a secure neighbor discovery protocol for resource limited devices in low-power and lossy networks. That protocol uses reduced size public key and signature, and simpler signature calculations in comparison to a secure neighbor discovery protocol for securing neighbor discovery protocol communications that are more suitable for low-power and lossy networks.

IPv6 neighbor discovery has been extended to specific networks. For example, U.S. Patent Publication 20130091269 describes a distributed IPv6 neighbor discovery for large data switching systems, in which all neighbor discovery operations and functionality are distributed to a switch device. Each neighbor discovery process in the switch device operates as an individual neighbor discovery router node.

U.S. Pat. No. 8,335,505 describes neighbor discovery in an IPv6-based mobile system. A mobile station includes a mapping table storing a connection identifier (CID) prefix and a neighbor identifier, a controller generating a CID with respect to a message that is transmitted by referring to the mapping table, and a message transmitter for transmitting the message to a base station connected the mobile station, by using the CID.

A smart meter or sensor node is different from a host in the conventional IPv6 network and the 6LoWPAN network because the typical node, when compared to the host, has limited resources, such as processing and transmitting power, memory, etc. However, nodes such as smart meters are typically mains-powered and do not sleep. Therefore, the smart meter is different from a host in the 6LoWPAN network.

The main difference is that in the IPv6 network and the 6LoWPAN network, the host can reach at least one router. This may not be the case in the smart meter network. In the smart meter network, the concentrators only operate as routers. Most of the smart meters are multiple hops away from the concentrators. There are no 6LoWPAN routers to distribute the prefix from the concentrators to the smart meters because installation of 6LoWPAN router in smart meter network is impractical for cost reason. Neighbor discovery methods for large switching systems and for mobile systems are not suitable for the smart meter networks. Accordingly, it is desired to provide a neighbor discovery method for smart meter networks.

SUMMARY OF THE INVENTION

In a wireless network according to embodiments of the invention, smart meters or sensor nodes act as IPv6 hosts, and concentrators act as IPv6 routers. Various embodiments of the invention provide a method for discovering neighboring nodes in the wireless network.

A node (smart meter or concentrator) in the smart meter network constructs a unique 64-bit interface identifier from a 48-bit MAC address. Using the 64-bit interface identifier, a node can construct a unique link-local address for use in a private network to avoid duplicated address detection. Using the link-local addresses, nodes in the smart meter network can discover neighboring nodes by transmitting unsolicited Neighbor Advertisement message (NA) messages.

After neighbor discovery, the concentrator(s) initiates a Router Advertisement (RA) relay nodes selection process. To reduce communication overhead, a limited number of smart meters are selected as RA message relay nodes, which also relay IPv6 address registration (AR) messages.

After relay nodes are selected, the concentrator(s) transmits the RA message periodically. After receiving the RA message, the relay nodes re-transmits the RA message to propagate the RA message to all smart meters.

After receiving the RA messages, smart meter configures unique IPv6 address by using subnet prefix contained in selected RA message and its 64-bit interface identifier. Smart meter then register at selected concentrators via the relay nodes.

DETAILED DESCRIPTION OF THE PREFERRED EMBODIMENTS

Figure 1:
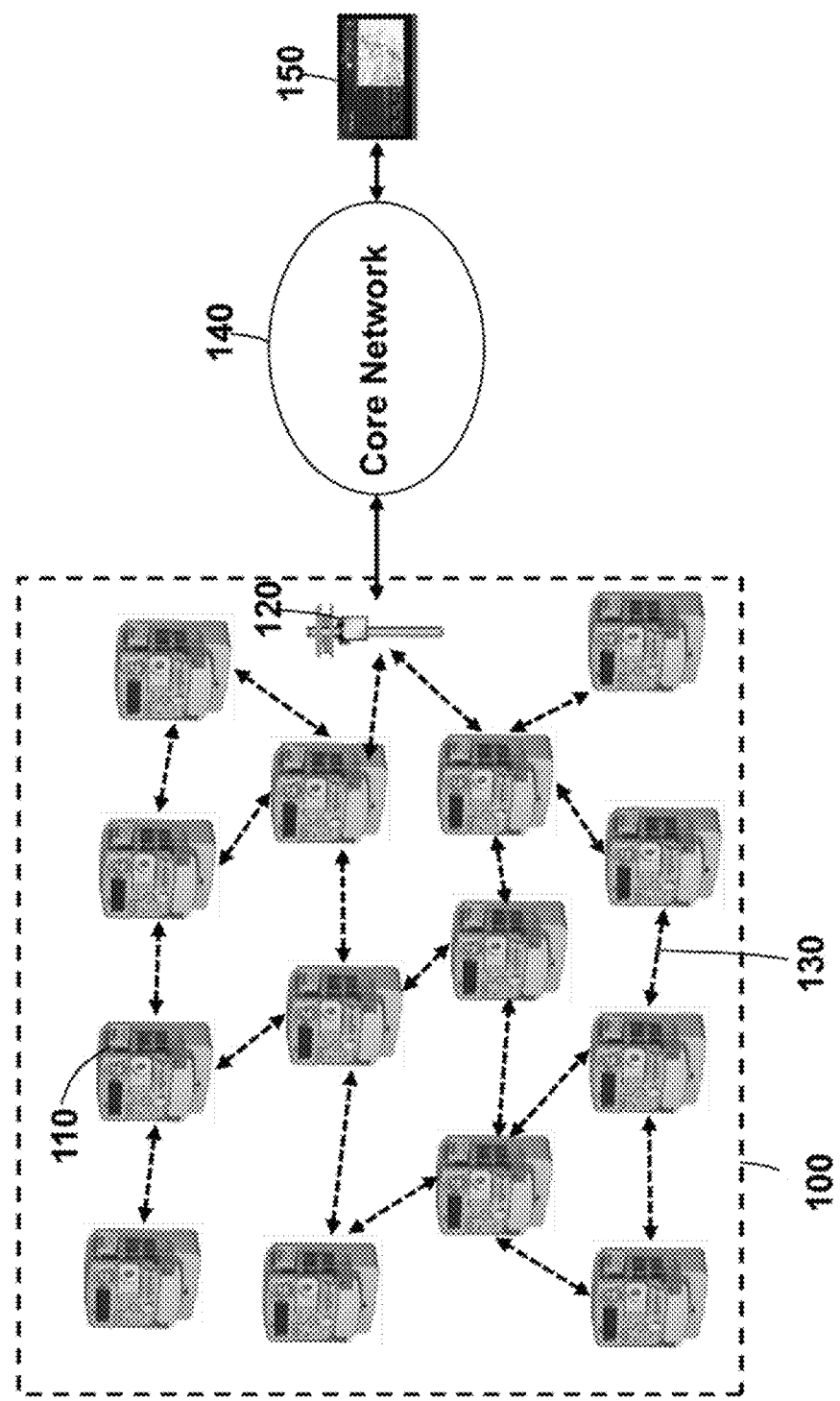
FIG. 1 is a schematic of smart meter network in which embodiments of the invention can operate.

FIG. 1 shows a smart meter network in which embodiments of the invention can operate. The smart meter network 100 includes a set of smart meters 110 and at least one data concentrator 120. A large network typically includes a set of concentrators. The smart meters and the concentrator form a mesh topology and communicate using wireless links 130. In practice, a smart meter networks can include millions of nodes.

Although the example network described herein is for smart meters, it is understood that the embodiments can also be applied to other wireless networks, such sensor networks, and networks used for industrial automation, building and home automation, and environment monitoring.

On an uplink, the smart meters transmit data packets through one or multiple hops to the concentrator. The concentrator transmits the data packets to a core network 140. The core network 140 transfers data packets to a metering data management system (MDMS) 150.

On a downlink, the MDMS 150 transmits control or management packets to the core network 140, which forwards packets to the concentrator 120, which then forwards the packets to the smart meters via one or multiple hops.

Unique IPv6 Link-Local Address Configuration for Smart Meter

Figure 2:
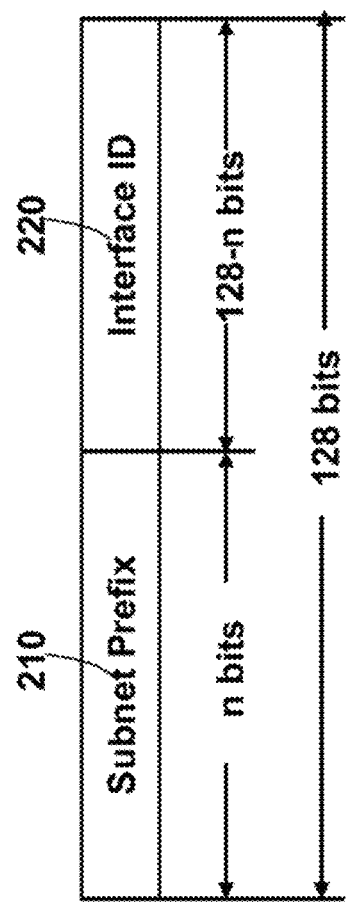
FIG. 2 shows structure of IPv6 address used by the embodiments of the invention.

As shown in FIG. 2, an IPv6 address is 128 bits. The address includes an n bits subnet Prefix 210 and a 128-n bits interface ID (IID) 220.

For a link-local address, the subnet prefix is pre-defined as FE80::/10. Address configuration procedure only needs to configure the interface ID. There are many ways to do this. To avoid duplicate address detection, it is necessary to configure a unique link-local address. For the smart meter, its 48-bit MAC address is used to configure the unique interface ID as described in the IETF standard RFC 4291, which defines how to use the 48-bit MAC address to configure the unique 64-bit interface ID. Because the interface ID composed from the 48-bit MAC address has universal scope, no duplicated address detection is needed.

Figure 3A:
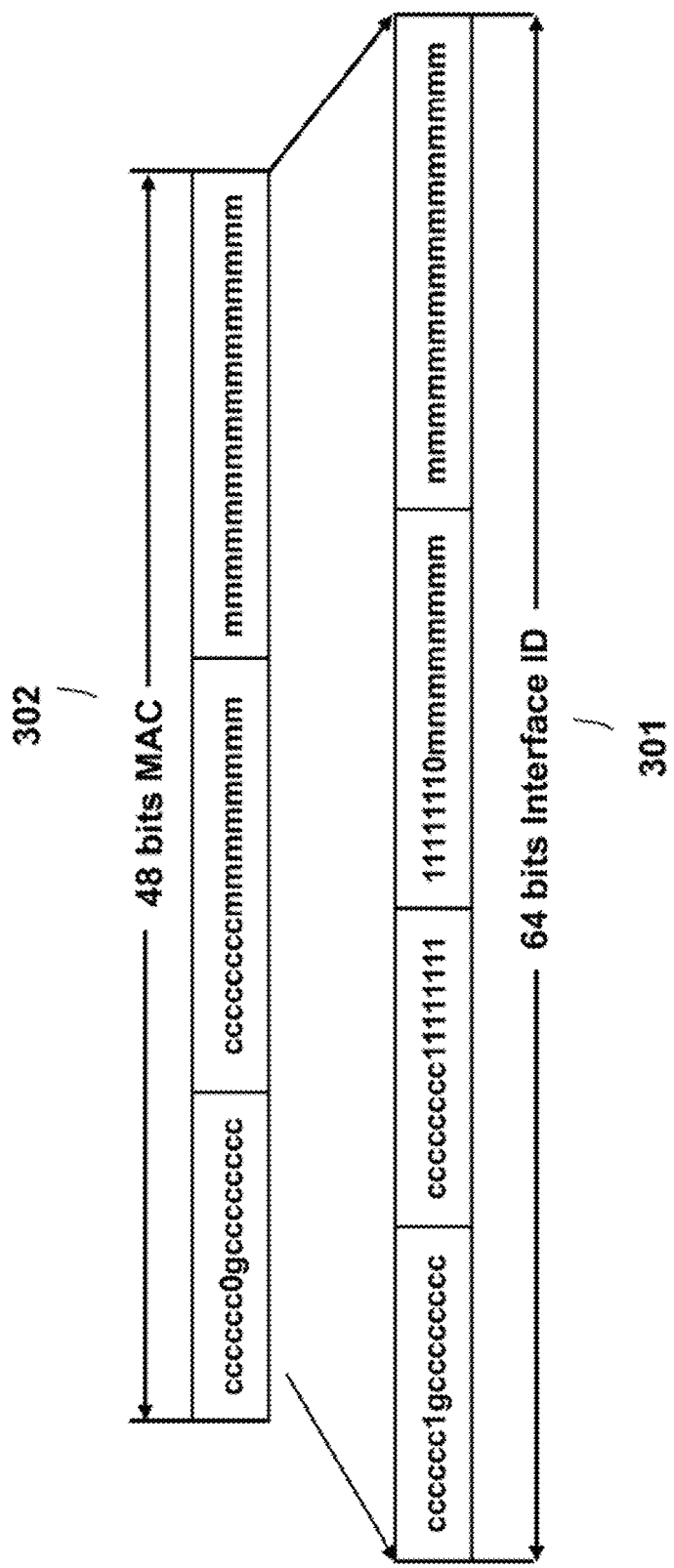
FIG. 3A shows 64-bit interface identifier configured by using 48-bit MAC address used by the embodiments of the invention.

FIG. 3A shows unique 64-bit interface ID 301 configured from the 48-bit MAC address 302, where "c" represents the bits of the assigned company-id, "0" is the value of the universal/local bit to indicate global scope, "g" is individual/group bit, and "m" represents the bits of a manufacturer-selected extension identifier.

Figure 3B:
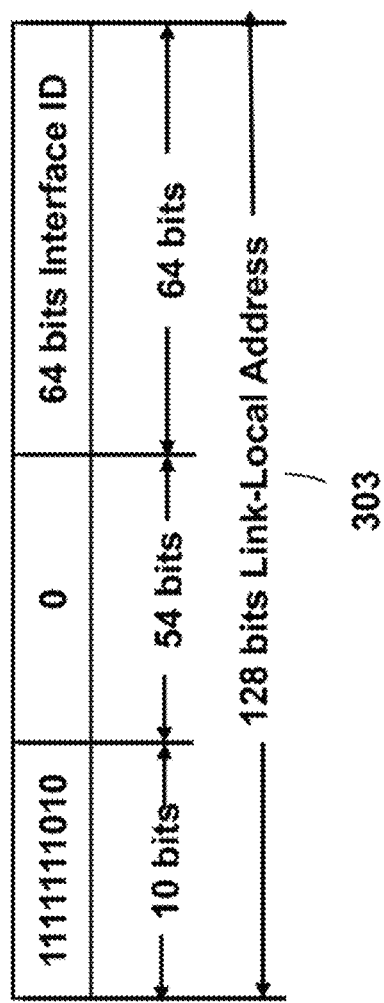
FIG. 3B shows 128-bit link-local address configured by using 64-bit interface identifier used by the embodiments of the invention.

FIG. 3B shows unique 128-bit link-local address 303 configured from the 48-bit MAC address.

Neighbor Discovery

Each node (smart meter or concentrator) in the smart meter network maintains a neighbor set (NB), which is initially empty.

At network startup, each node configures the unique link-local address using the 48-bit MAC address and then multicasts an unsolicited NA message to announce its interface ID with its link-local address as the source address. After receiving the unsolicited NA message from a neighboring node, the receiving node adds an entry into its neighbor set. To make sure its NA message is received by all neighboring nodes, a node may transmit unsolicited NA message multiple times.

For the concentrator C 120, its neighbor set is denoted as NB(C). For a smart meter M, its neighbor set is denoted as NB(M). For any two nodes N1 and N2, a difference set Diff(M1, M2) is defined as NB(M1)−NB(M2), that is, Diff (M1, M2) only contains nodes in NB(M1), but not in both NB(M1) and NB(M2).

RA Message Relay Node Selection

The smart meter needs the unique IPv6 address to communicate with the MDMS 150. With the interface ID configured from its MAC address, the smart meter needs to obtain the subnet prefix to complete its unique IPv6 address configuration. The subnet prefix can be configured manually or obtained from a DHCPv6 server or through a RA message transmitted by an IPv6 router. Manual configuration is not practical for smart meters due to nature of smart meter deployment. Installing DHCPv6 server in smart meter network is also impractical. The only feasible way is to obtain the subnet prefix via the RA message.

In a smart meter network, only the concentrator(s) acts as the IPv6 routers. All smart meters must obtain the subnet prefix from the RA message transmitted by the concentrator (s) and register at one of the concentrators. However, most of smart meters cannot directly communicate with any concentrator. The smart meter network is different from the conventional IPv6 network and the 6LoWPAN network. In the IPv6 network, each host can directly receive the RA message from at least one IPv6 router, and in the 6LoWPAN network, and each host can directly receive the RA message from at least one 6LoWPAN router or the 6LoWPAN border router. In the smart meter network, the RA message needs to be relayed hop-by-hop from the concentrator(s) to the smart meters.

A naive way to propagate the RA message from the concentrator(s) to all smart meters is by broadcast flooding. That is, each smart meter rebroadcasts all received RA messages. The problem with broadcast flooding is an increased communication overhead. As an IPv6 router, the concentrator in smart meter network transmits the RA periodically. Periodic broadcast flooding causes too much overhead.

Figure 4:
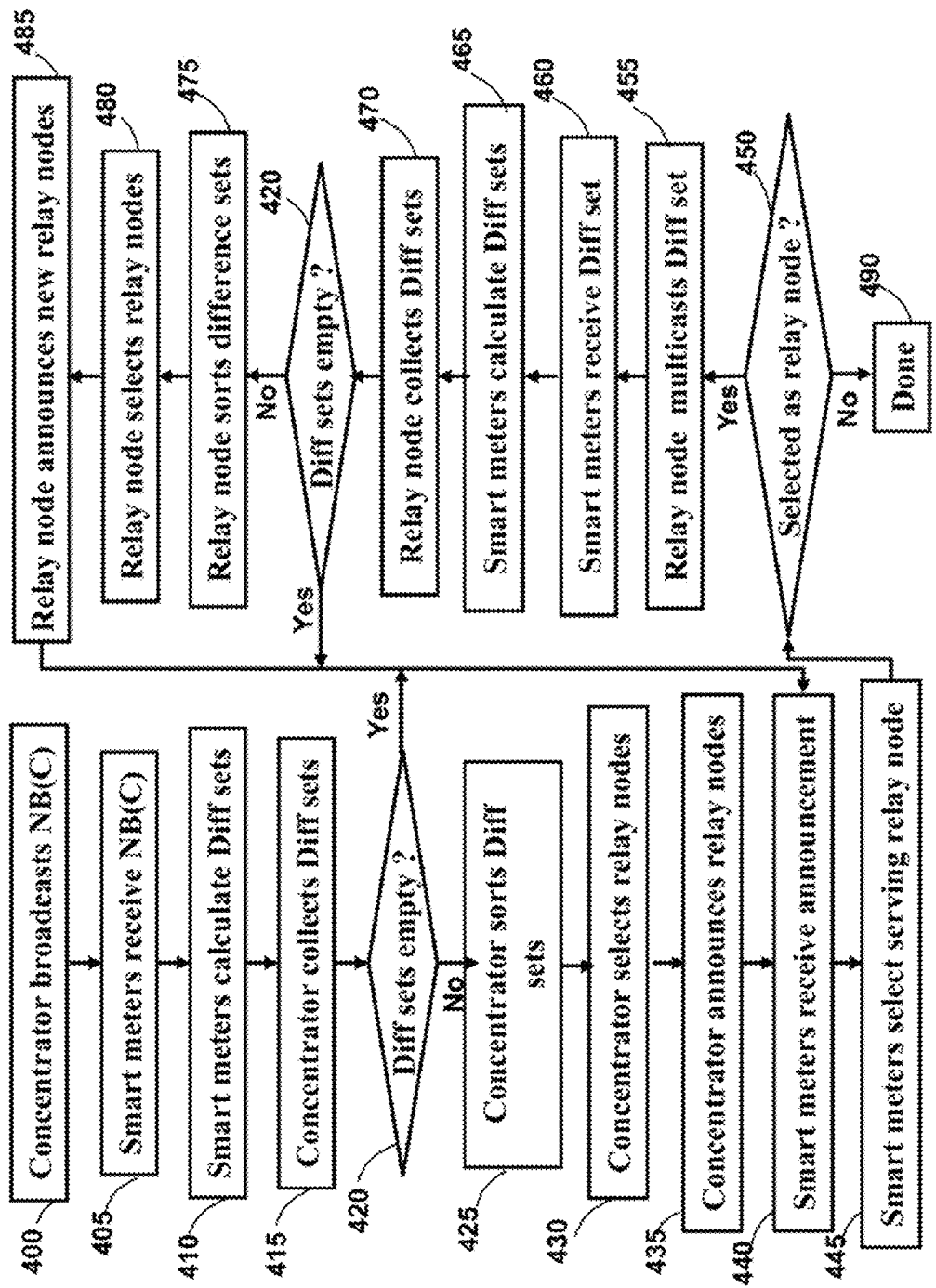
FIG. 4 is flowchart of RA message relay node selection according to embodiments of the invention.

As shown in FIG. 4, the concentrator C initiates a RA message relay node selection process after the completion of neighbor discovery. The concentrator selects 1-hop relay nodes. To do so, the concentrator C broadcasts 400 its neighbor set NB(C) to all neighbors. After a neighbor node $C_i$ of concentrator receives 405 the NB(C) from the concentrator, the neighbor determines 410 the difference set Diff($C_i$, C)=NB($C_i$)−NB(C). The concentrator then collects 415 the difference sets from all its neighbors. Difference set collection can be done by the concentrator polling each of its neighbor C, to transmit the Diff($C_i$, C) to the concentrator or by the neighbors transmitting the difference sets to the concentrator using a random backoff mechanism.

After receiving the difference sets from all its neighbors, the concentrator checks 420 the sizes of the difference sets. If all the difference sets are empty, then the concentrator broadcasts 435 a relay node announcement message with an empty relay node set. Otherwise, the concentrator sorts 425 the difference sets in a small to large order as Diff($C_1$, C), Diff($C_2$, C), ..., Diff($C_n$, C), where $C_1, C_2, ..., C_n$ are neighbors of the concentrator C. After sorting Diff sets, concentrator performs 1-hop relay node selection 430 as follows:

$$\text{If } Diff(C_i, C) \subset \bigcup_{f=i+1}^{n} Diff(C_j, C), C_i \text{ is not a relay node,} \quad (1)$$

$$i = 1, 2, \ldots, n-1$$

Equation (1) states that for each neighbor $C_i$ (i=1, 2, ..., n−1) of node C, if its difference set Diff($C_i$, C) is included in a union of difference sets that have sizes greater than the size of Diff($C_i$, C), then the neighbor $C_i$ is not selected as a relay node for node C. As a result, if a neighbor has an empty difference set, then this neighbor is not selected as a relay node.

For example, concentrator C has three neighbors N1, N2, N3. So node C broadcasts its neighbor set {N1, N2, N3} to let nodes N1, N2 and N3 to calculate their difference sets. N1's neighbor set is {N2, N4, N5, N6}, so Diff(N1, C)={N2, N4, N5, N6}−{N1, N2, N3}={N4, N5, N6). N2's neighbor set is {N4}, so Diff(N2, C) {N4}−{N1, N2, N3}={N4}. N3's neighbor set is (N7, N8, N9, N10}, so Diff(N3, C)={N7, N8, N9, N10}−(N1, N2, N3}={N7, N8, N9, N10}

After calculation the difference sets, N1, N2 and N3 send their Diff sets to concentrator C. Based on size, node C ranks the difference sets as Diff(N2, C)={N4}, Diff(N1, C)=(N4, N5, N6), Diff(N3, C)={N7, N8, N9, N10}. Because Diff(N2, C) is a subset of Diff(N1, C), so N2 is not selected as relay node. Diff(N1, C) and Diff(N3, C) are mutually not inclusive, so N1 and N3 are selected as relay nodes.

The concentrator eliminates neighbors that are not selected as relay nodes by using equation (1). The remaining neighbors are selected as relay nodes. After selecting 1-hop relay nodes, the concentrator broadcasts 435 a relay node announcement message that contains all 1-hop relay nodes selected by concentrator.

After receiving 440 1-hop relay node announcement message, all neighbors of the concentrator select 445 the concentrator C as the serving relay node to receive the RA message and as the next hop node for IPv6 address registration. If a neighbor is not selected 450 as a relay node, then this neighbor is done 490. Neighbors selected as 1-hop relay nodes by the concentrator perform 2-hop relay node selection. To do so, the 1-hop relay node R multicasts 455 its difference set Diff(R, C) to its neighbors in set Diff(R, C). Assume node R has m neighbors $R_1, R_2, ..., R_m$ in set Diff(R, C). When the neighbor node $R_i$ (i=1, 2, ..., m) of relay node R receives 460 the Diff(R, C) from node R, the neighbor $R_i$ determines 465 the difference set Diff($R_i$, R)=NB($R_i$)−Diff(R, C). The relay node R then collects 470 the difference sets Diff($R_i$, R) from its neighbors in the Diff(R, C) the same was as the concentrator.

After receiving the difference sets Diff($R_i$, R), the relay node R checks 420 the sizes of the collected difference sets. If all difference sets are empty, then the node R multicasts a relay node announcement message with an empty relay node set. Otherwise, the node R sorts 475 the difference sets Diff ($R_i$, R) in a small to large order, and selects 480 the 2-hop relay nodes the same way as the concentrator.

After selecting the 2-hop relay nodes, the relay node R multicasts 485 a relay announcement message that contains all newly selected 2-hop relay nodes. After receiving 440 the relay node announcement message, the neighbors of the relay node R in Diff(R, C) select node R as the serving relay node to receive the RA message and as the next hop node for the IPv6 address registration. 2-hop relay nodes then perform 3-hop relay node selection.

This relay node selection process continues until all the smart meter nodes have selected a serving relay node to the receive RA message, and as next hop node for IPv6 address registration.

Figure 5:
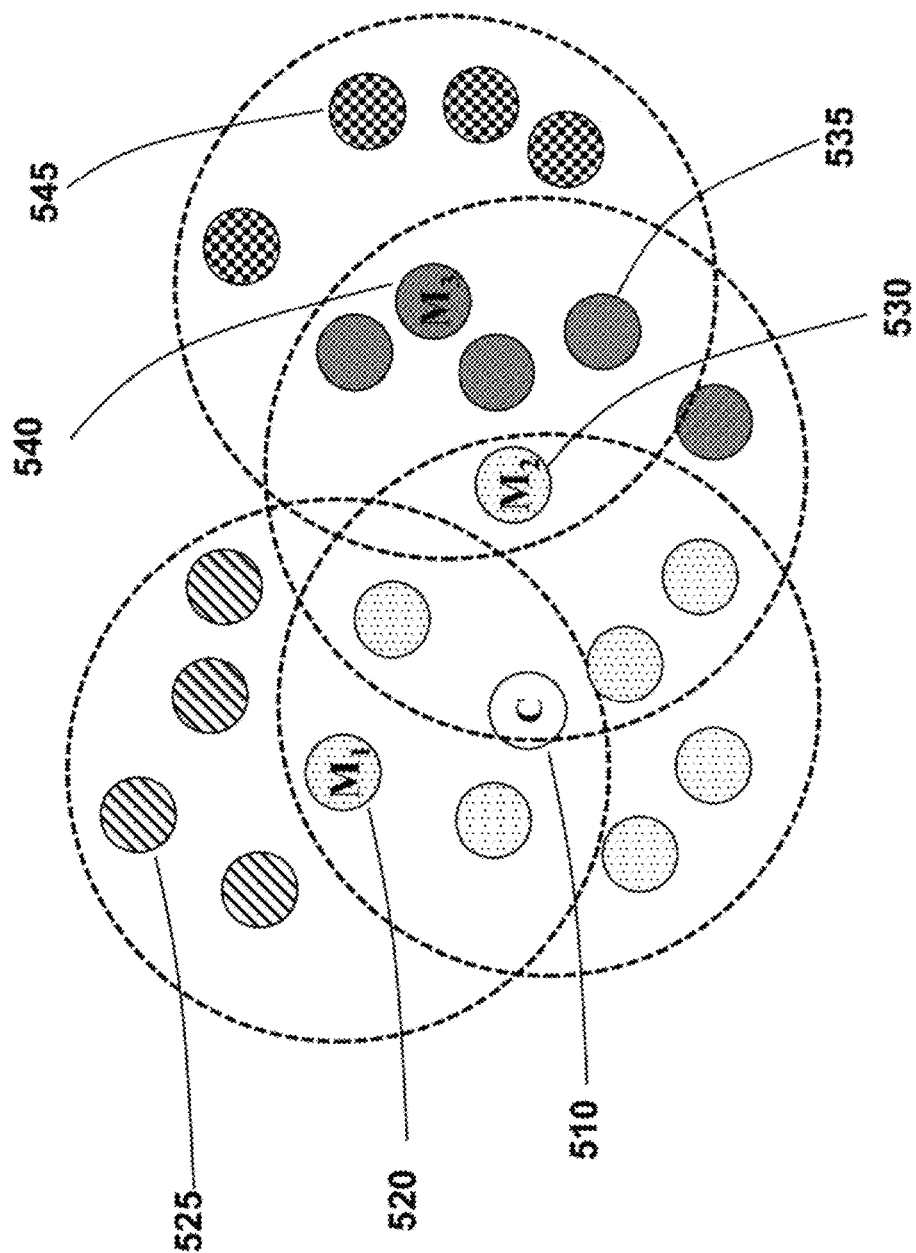
FIG. 5 is a schematic of an example RA message relay node selection according to embodiments of the invention.

FIG. 5 shows an example of relay node selection in which concentrator C 510 has eight neighbors. Neighbor 520 $M_1$'s difference set Diff($M_1$, C) has four nodes 525 and neighbor 530 $M_2$'s difference set Diff($M_2$, C) has five nodes 535. The concentrator C selected its neighbors $M_1$ 520 and $M_2$ 530 as 1-hop relay nodes. For each node $NM_1$ in Diff($M_1$, C), Diff ($NM_1$, $M_1$) is empty, and therefore, node M1 does not select 2-hop relay node. However, for some node $NM_2$ in Diff($M_2$, C), Diff($NM_2$, $M_2$) is not empty. For example, node 540 $M_3$'s difference set has four nodes 545 and therefore, node $M_2$ selected node $M_3$ 540 as 2-hop relay node. Because all Diff sets collected by $M_3$ are empty, node $M_3$ does not select a 3-hop relay node.

RA Message Distribution and IPv6 Address Configuration

After relay nodes are selected, the concentrator(s) configures the RA message and broadcasts the RA message. After receiving the RA message transmitted by the concentrator(s), all 1-hop smart meters configure their IPv6 address by using the prefix contained in the RA message and the unique interface ID. All 1-hop relay nodes re-broadcast the RA message to the 2-hop smart meters. The 2-hop smart meters receive the RA message and configure their unique IPv6 addresses. The 2-hop relay nodes re-broadcast RA message to 3-hop smart meters. This process continues until RA propagates to all smart meters.

Figure 6:
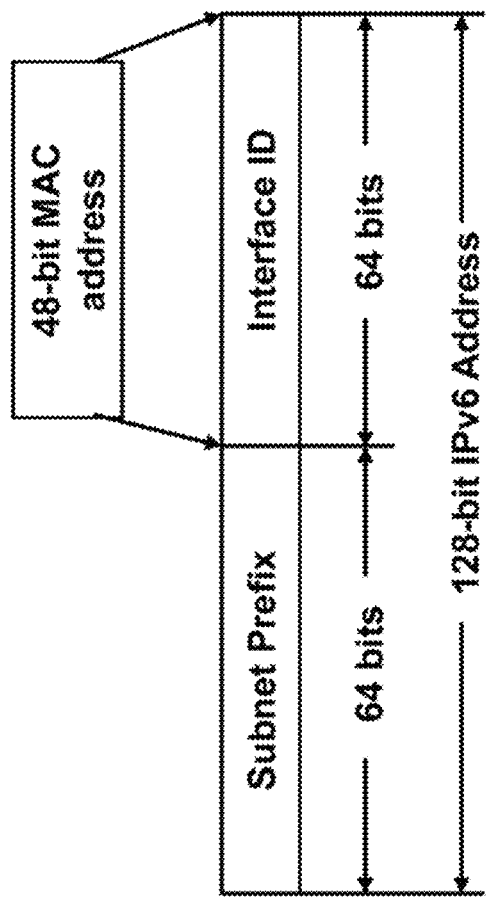
FIG. 6 shows unique IPv6 address configured from subnet prefix and 64-bit interface identifier used by the embodiments of the invention.

FIG. 6 shows a structure of a configured unique IPv6 address.

Relay nodes do not modify the RA message. The relay nodes only relay RA message.

IPv6 Address Registration and Confirmation

After the IPv6 address is configured, the smart meter configures a unicast NS message with an Address Registration Option (ARO) to the concentrator. The smart meter transmits the configured NS message to its serving relay node. After receiving the NS message, the relay node makes a record of (Destination, NextHop) and forwards the NS message to its serving relay node, where Destination is the IPv6 address of the smart meter that generated the NS message and NextHop is the IPv6 address of smart meter from which this relay node received the NS message.

After receiving a unicast NS with the ARO option, the concentrator, as the IPv6 router, performs IPv6 address registration and configures the NA message including an ARO option with a status field indicating the success or failure of registration. The concentrator transmits the NA message to the relay node from which the concentrator received the NS message.

After receiving the NA message with the ARO option, the relay node forwards the NA message towards the destination by using the record (Destination, NextHop).

After receiving the NA message with ARO option indicating successful registration, smart meter can start packet transmission.

New Smart Meter IPv6 Address Configuration And Registration

When a new smart meter is added to the network, the new smart meter transmits the RS message. In response, a neighbor transmits a RA message to the new meter. The new meter configures its IPv6 address and registers the IPv6 address via the neighbor from which the new meter received the RA message. Even if the neighbor is not a relay node, the neighbor relays the IPv6 address registration messages for the new smart meter node.

Although the invention has been described by way of examples of preferred embodiments, it is to be understood that various other adaptations and modifications can be made within the spirit and scope of the invention. Therefore, it is the object of the appended s to cover all such variations and modifications as come within the true spirit and scope of the invention.

We claim:

1. A method for discovering neighboring nodes in a wireless network of nodes, wherein the nodes include a set of concentrators acting as Internet Protocol version 6 (IPV6) routers and a set of sensor nodes acting as IPv6 hosts, and wherein any of the sensor nodes can act as relay nodes, comprising the steps of:
    configuring, in each node, a 64-bit interface identification (ID) using a 48-bit Media Access Control (MAC) address;
    configuring, in each node, a unique IPv6 link-local address using the 64-bit interface ID;
    discovering, in each node, the neighboring nodes by transmitting unsolicited Neighbor Advertisement (NA) messages and to announce the unique IPv6 link-local address to the neighboring nodes;
    adding the unique IPv6 link-local addresses received in the neighboring nodes to a neighbor set;
    initiating in the concentrators an RA message relay node selection process by distributing a Router Advertisement (RA) messages from the concentrators to the sensor nodes using the relay nodes; and
    registering, in response to receiving the RA messages, the unique IPv6 link-local addresses of the sensor nodes at the concentrators by using the relay nodes and the neighbor sets of the sensor nodes, and wherein for each neighbor node $C_i$ of node C, if a difference set $Diff(C_i, C)$ is included in a union of difference sets that have sizes greater than a size of the difference set $Diff(C_i, C)$, then the neighbor node $C_i$ is not selected as the relay node for node C, otherwise, the neighbor node $C_i$ is selected as the relay node for node C;
    wherein the $C_i$ and C are positive numbers.

2. The method of claim 1, further comprising: adding, in one of the nodes, an entry into a neighbor set after receiving of the unsolicited NA message.

3. The method of claim 2, wherein the concentrator broadcasts the neighbor set to all neighboring nodes.

4. The method of claim 1, wherein each sensor node determines a difference set.

5. The method of claim 4, wherein the concentrator collects the difference sets by polling each neighboring node or by the neighbor node transmitting the difference sets to the concentrator using a random backoff mechanism.

6. The method of claim 4, wherein the concentrator sorts the difference sets in a small to large order.

7. The method of claim 4, wherein the sensor node multicasts its difference set to neighboring nodes in the difference set.

8. The method of claim 4, wherein the sensor node collects the difference sets determined by the neighbor nodes in the difference set of the sensor node.

9. The method of claim 1, wherein the concentrator broadcasts the selected 1-hop relay nodes.

10. The method of claim 1, wherein the sensor node selects a serving relay node to receive the RA message and for IPv6 address registration.

11. The method of claim 1, wherein the sensor node sorts collected the difference sets.

12. The method of claim 1, wherein the sensor node selects next hop relay nodes and broadcasts the selected relay nodes.

13. The method of claim 1, wherein the sensor node registers the IPv6 address at the via a multi-hop relay process.

14. The method of claim 1, wherein the concentrator confirms the IPv6 address registration via a multi-hop relay process.

* * * * *